Feb. 4, 1941.   P. KUCERA   2,230,597
METHOD OF HERMETICALLY SEALING THE INNER WALL OF A REFRACTORY AIR BELL
Filed July 23, 1938

Inventor
Peter Kucera
by Brown + Parham
Attorneys

Witness

Patented Feb. 4, 1941

2,230,597

UNITED STATES PATENT OFFICE 2,230,597

METHOD OF HERMETICALLY SEALING THE INNER WALL OF A REFRACTORY AIR BELL

Peter Kucera, Allison Park, Pa., assignor to Hartford-Empire Company, Hartford, Conn., a corporation of Delaware Application July 23, 1938, Serial No. 220,900

3 Claims. (Cl. 49—77)

This invention relates to the feeding of molten glass in mold charges of predetermined weight and shape by the use of a pneumatic feeder as, for example, that of the type disclosed in Patent No. 1,997,799, granted to me as assignor to Hartford-Empire Company, Hartford, Connecticut.

A pneumatic glass feeder of the type above referred to comprises a glass feeding forehearth or container having an outlet in its bottom and a refractory bell supported in the feeding container above and in axial alignment with the outlet. The bottom or rim portion of the bell is continuously submerged by glass of the supply body in the container and a space normally exists in the bell above the glass therein for the application to such glass of periodic super-atmospheric and sub-atmospheric impulses by which discharge of glass through the outlet is periodically accelerated and periodically retarded or halted.

A feeder of this type may have the air bell supported in the feeding container in the position described through the instrumentality of a hollow metallic shank which fits into the upper portion or stem of the air bell and affords support therefor.

The refractory walls of an air bell of the character described are sufficiently porous to allow some air to pass therethrough. Moreover, some air likewise may pass through the joint between the metallic supporting shank and the contiguous wall of the air bell. These shortcomings of air bell assemblies of the character described militate against accuracy of control of the pressures on the glass in the cavity of the bell and hence tend to interfere with the production by the feeder of charges of uniform or dependably controlled weight.

An object of the present invention is to obviate or overcome the above pointed out shortcomings or faults of air bells of the character described.

A further object of the invention is to provide a simple, reliable and efficient method of hermetically sealing the inner wall of the cavity of a refractory air bell of the character described, including the surfaces at its juncture with a metallic supporting shank while permitting free ingress and egress of air to and from the cavity of the bell through a passage in the metallic supporting shank.

Figure 1:
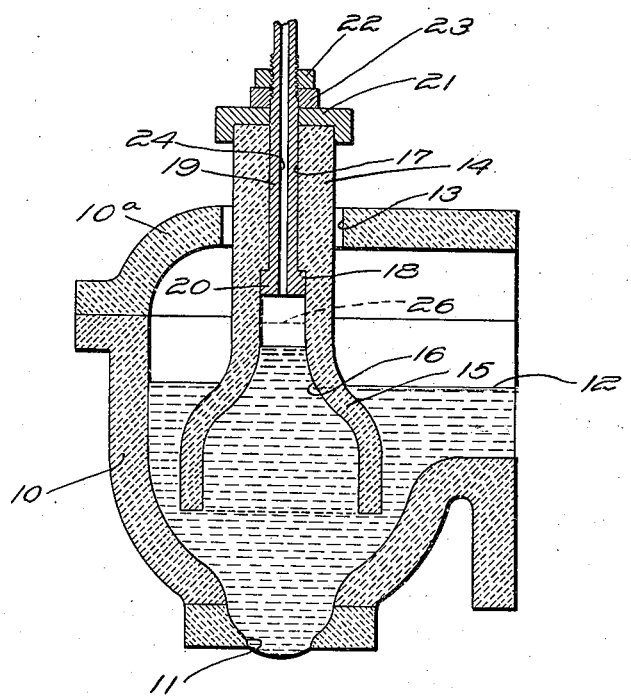
Figure 2:
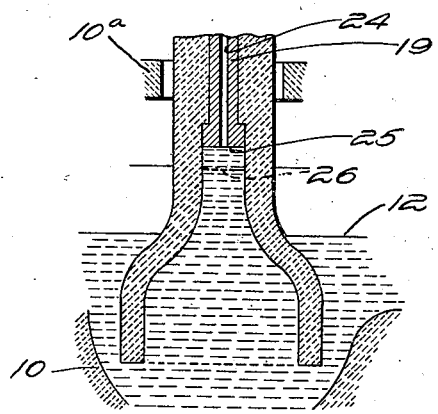

Other objects and advantages of the invention will hereinafter become apparent or will be pointed out in the following description of the manner of applying the invention to an air bell assembly in the feeding forehearth or container of a pneumatic feeder, as shown in the accompanying drawing, in which Figure 1 is a vertical section through the glass feeding or delivery end portion of a forehearth or feeding container equipped with an air bell assembly of the character above referred to at an early stage in the performance of the method of the present invention to hermetically seal the inner wall of the air bell cavity, and Fig. 2 is a vertical sectional view showing the air bell assembly and a portion of the forehearth or feeding container, together with molten glass completely filling the cavity of the air bell as effected by a step of the method of the present invention, and showing also by a dot-and-dash line the maximum height to which glass will subsequently be drawn upwardly in the cavity of the air bell during normal glass feeding operations.

In the drawing, a glass feeding container 10 has a discharge outlet 11 (Fig. 1) in its bottom. The showing of the container and of its outlet is largely diagrammatic, as these parts may be of any suitable shape and construction. In general, the structure shown represents the outer end portion of a glass feeding forehearth to which molten glass passes continuously from a melting tank (not shown), so that a supply body of molten glass continuously fills the feeding container to a level such as that indicated at 12. The top or cover portion of the container, designated 10a, is provided with a suitable opening 13, through which extends the neck or stem portion 14 of a refractory air bell 15. The air bell 15 is supported in position to depend into the molten glass in the feeding container, usually in axial alignment with the outlet, so that glass normally seals the lower end of the air bell and fills a substantial portion of the cavity therein.

As shown, the cavity 16 of the air bell is merged into a central bore 17 of reduced diameter extending through the stem or neck portion of the refractory bell member, so as to provide a downwardly facing shoulder 18 at the upper end of the air bell cavity. A metallic hollow shank 19 extends through the bore 17 of the stem or neck portion of the refractory bell, and has an enlarged lower end portion or head 20 fitting closely in the upper portion of the cavity of the air bell against shoulder 18.

A cap 21 on the upper end of the stem of the air bell surrounds the protruding portion of the shank 19, and nuts 22 and 23 are threaded on such shank against the cap 21 to connect the shank 19 firmly, although detachably, with the refractory bell. The arrangement is such that the refractory air bell may be supported within the feeding container at a predetermined desirable distance above the outlet 11 by attaching the shank 19 to any suitable supporting means (not shown). Also, the bore of the shank, indicated at 24, is adapted to be, and in practice is, suitably connected with any suitable source of supply of super-atmospheric and sub-atmospheric pressures, such as the air rarefying and compressing device shown in Patent No. 1,997,799. This bore 24 in the metallic shank 19 is too small in cross-sectional area for molten glass to enter and pass upwardly therein.

The arrangement described is subject to the disadvantages hereinbefore mentioned in that air may filter through the refractory walls of the cavity of the air bell above the glass therein, and also may pass through the joint between the metallic shank 19 and the surrounding stem or neck portion of the air bell. While this passage of air may be of small volume, it necessarily is uncontrolled and therefore interferes with the attainment of an accurate control of the desired pressures on the glass in the air bell cavity, and hence tends to prevent desirable control of the weight of the successive charges which in practice are obtained by regularly timed operations of severing mechanism (not shown) which severs glass charges from successive mold charge masses of glass in suspension from the outlet of the feeding container.

To obviate this disadvantage the present invention proposes to provide a glaze or molten glass seal for the inner wall of the refractory air bell above the level to which glass rises in the air bell during normal feeding operations and for the joint between the metallic shank 19 and the refractory air bell. To effect this result, the glass in the feeding container is brought to predetermined temperature and condition of viscosity before the commencement of glass feeding operations, after the air bell has been disposed within the feeding container substantially as shown in Fig. 1. This temperature and viscosity may be those appropriate for the feeding operations intended, or in some instances the glass may be heated to a higher temperature before the glass feeding operations for the carrying out of the present invention.

After the glass is at the temperature and has the viscosity desired, an abnormal sub-atmospheric pressure is produced in the cavity of the air bell to cause molten glass to rise therein completely to the top of such cavity, and against the metallic shank 19, as to the level indicated at 25, in Fig. 2. As aforesaid, the bore 24 of the shank 19 is too small for the molten glass to enter it. The molten glass thus will be forced intimately into contact with all portions of the inner wall of the refractory air bell below the level of the small passage 24 and against the lower surface of the head 20 of the metallic shank 19 at the joint between it and the refractory air bell. The abnormal subatmospheric pressure referred to then is relieved, so that the glass will fall to a lower level, as to the level of the glass in the feeding container outside of the air bell, if the pressures on the glass are equal at both places. Thereafter the temperature and viscosity of the glass are regulated, if further regulation thereof is required to produce the conditions desired, and feeding operations may be commenced, making use of normal periodic super-atmospheric and sub-atmospheric pressures.

During such normal feeding operations, the maximum or highest level to which glass will be drawn by sub-atmospheric pressure on the glass in the air bell cavity may be represented by the dot-and-dash line 26 in Fig. 2.

It will be clear from the foregoing description that the preliminary application of molten glass to the wall of the portion of the air bell cavity that normally is located above the glass level will cause this wall to be coated with molten glass or glaze, thus producing a hermetic seal at the inner surfaces of this portion of the air bell cavity and at the joint between the metallic shank 19 and the refractory air bell. Since this portion of the air bell assembly is within the feeding container in a zone of high temperatures, such glass as may have been raised to position to cover and temporarily seal the lower end of the small passage 24 in the metallic shank 19 will be sufficiently molten or plastic to be blown therefrom when super-atmospheric pressure has been applied thereto after the relief of the abnormal sub-atmospheric pressure referred to. Thereafter, this passage 24 will be in open communication with the space above the glass in the air bell, and the super-atmospheric and sub-atmospheric impulses may be applied to such glass at the times determined by the operations of the timer of the feeding apparatus.

Uncontrolled passage of air through the refractory walls of the air bell and at the joint between the metallic shank and the air bell will thus be prevented and the periodically varied pressures on the glass in the air bell may be regulated to regulate and control accurately the weight of the charges obtained by the use of the glass feeding apparatus. The invention is susceptible of use to hermetically seal various surfaces other than that specifically described in the foregoing specification.

What I claim is:

1. The method of hermetically sealing the inner wall of an air bell of a pneumatic glass feeder, comprising the steps of disposing the air bell in its operative position so that the bottom or rim portion of the bell is below the surface of a supply body of molten glass in a feeding container of the feeder and the upper portion of the cavity of the bell is above the highest level to which glass rises in the cavity of such bell during normal operations of such feeder, applying a sub-atmospheric pressure to the glass in said bell sufficiently low to cause molten glass of the supply body to rise in the cavity of the bell to a height sufficient to apply molten glass to the entire inner surface of said air bell, and thereafter relieving said sub-atmospheric pressure.

2. The method of hermetically sealing the inner wall of an air bell of a pneumatic glass feeder, said air bell having a passage of small cross sectional area at its top for applying pneumatic pressures to the cavity of said bell, comprising the steps of disposing said bell in operative position in a glass feeding container of the feeder so that the bottom or rim portion of the bell is below the surface of a supply body of molten glass in the container and the upper portion of the cavity of the bell is located above the highest level to which glass will rise therein during normal operations of such feeder and in a zone of high temperature, heating the glass of the supply body at the bottom of said bell to a sufficiently high temperature to cause it to coat the inner surface of the bell when applied thereto, applying a sub-atmospheric pressure to the glass in the cavity of said bell sufficiently low to cause said glass to rise completely to the top of said cavity against the entire inner wall surface thereof, relieving said pressure, and applying a positive pressure to said passage of small cross-sectional area to free the lower end thereof from any molten glass that might otherwise obstruct the same.

3. The method of hermetically sealing the inner wall of a refractory air bell of a pneumatic feeder, said air bell having a metallic supporting shank joined to the refractory bell at the top of the cavity of the bell, said shank having a bore of small cross-sectional area for applying pneumatic pressures to the cavity of said bell, comprising the steps of disposing the assembled bell and shank as a unit in operative position in a glass feeding container of the feeder so that the bottom or rim portion of the bell is below the surface of a supply body of molten glass in the container and the wall of the upper portion of the cavity, including the joint between said metallic shank and the refractory bell is located above the highest level to which glass will rise in said cavity during normal operations of the feeder and in a zone of high temperature, heating the glass at the bottom of the bell to a sufficiently high temperature to cause it to coat the inner surface of the bell when applied thereto, applying sub-atmospheric pressure to the glass in the cavity of the bell sufficiently low to cause said glass to rise into intimate contact with the entire inner surface of said cavity, including the joint between said refractory bell and its supporting shank, relieving said pressure, and applying a positive pressure to the bore of said shank to assure unobstructed subsequent communication between the lower end of said bore and the cavity of said air bell.

PETER KUCERA.